US010834566B2

(12) United States Patent
Daly et al.

(10) Patent No.: US 10,834,566 B2
(45) Date of Patent: *Nov. 10, 2020

(54) PROVIDING MULTIMEDIA WIRELESS EMERGENCY ALERTS

(71) Applicant: AT&T Intellectual Property I, L.P., Atlanta, GA (US)

(72) Inventors: Brian Daly, Atlanta, GA (US); Joseph Marx, Alexandria, VA (US); Charles Musgrove, Henderson, NV (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,802

(22) Filed: Apr. 14, 2020

(65) Prior Publication Data

US 2020/0275251 A1      Aug. 27, 2020

Related U.S. Application Data

(63) Continuation of application No. 16/287,140, filed on Feb. 27, 2019, now Pat. No. 10,652,721.

(51) Int. Cl.
*H04W 4/90* (2018.01)
*H04M 15/00* (2006.01)
*H04M 1/725* (2006.01)

(52) U.S. Cl.
CPC .......... *H04W 4/90* (2018.02); *H04M 1/72519* (2013.01); *H04M 15/61* (2013.01)

(58) Field of Classification Search
CPC ......... H04W 4/90; H04W 4/06; H04W 76/40; H04W 76/50; H04W 4/21; H04W 4/14;
(Continued)

(56) References Cited

U.S. PATENT DOCUMENTS 8,190,118 B2    5/2012 Sennett et al.
8,548,419 B1    10/2013 Sennett et al.
(Continued)

FOREIGN PATENT DOCUMENTS

WO    2009053111 A1    4/2009

OTHER PUBLICATIONS

CITA Wireless Emergency Alerts: Comments of CTIA. Federal Communications Commission. May 29, 2018. 16 pages.
(Continued)

*Primary Examiner* — Quan M Hua
(74) *Attorney, Agent, or Firm* — Amin, Turocy & Watson, LLP

(57) ABSTRACT

Example embodiments relate to a user equipment that can receive a cellular broadcast message comprising a data element identifying the cellular broadcast message as a wireless emergency alert. The network address information (e.g., URL) can identify a network location associated with multimedia content to be transmitted to the user equipment, the multimedia content stored at a repository associated with a server device. The user equipment can, in response to detecting that the cellular broadcast message comprises the data element, send a content request to the server device associated with the network location identified by the network address information, and subsequently it can receive the multimedia content from the server device and provide the multimedia content via a graphical user interface displayed on a screen of the user equipment.

20 Claims, 10 Drawing Sheets

(58) Field of Classification Search
CPC ....... H04W 92/02; H04W 4/40; H04W 4/025;
H04W 4/44; H04W 84/18; H04W 12/06;
H04W 48/04; H04W 4/46; H04W 76/14;
H04W 84/05; H04W 84/12; H04W 4/22;
H04L 12/1895
See application file for complete search history.

(56) References Cited

U.S. PATENT DOCUMENTS

| | | |
|---|---|---|
| 8,611,872 B2 | 12/2013 | Sennett et al. |
| 9,161,176 B2 | 10/2015 | Alberth, Jr. et al. |
| 9,693,210 B2 | 6/2017 | Sennett et al. |
| 9,820,121 B2 | 11/2017 | Sennett et al. |
| 2002/0184346 A1 | 12/2002 | Mani |
| 2010/0022262 A1 | 1/2010 | Aue |
| 2014/0134970 A1 | 5/2014 | Pazos et al. |
| 2016/0014584 A1* | 1/2016 | Webb .................. H04W 4/90 455/404.2 |
| 2016/0127439 A1 | 5/2016 | Ginnela et al. |
| 2017/0013433 A1 | 1/2017 | Lee et al. |
| 2017/0034681 A1 | 2/2017 | Netto et al. |
| 2017/0171722 A1* | 6/2017 | Lee ..................... H04H 20/59 |
| 2017/0171731 A1 | 6/2017 | Sennett et al. |
| 2018/0176749 A1 | 6/2018 | Hussaini |
| 2019/0141003 A1 | 5/2019 | Cottle et al. |

OTHER PUBLICATIONS

Office Action for U.S. Appl. No. 16/287,140 dated Sep. 18, 2019, 28 pages.

* cited by examiner

US 10,834,566 B2

PROVIDING MULTIMEDIA WIRELESS EMERGENCY ALERTS

RELATED APPLICATION

The subject patent application is a continuation of, and claims priority to, U.S. patent application Ser. No. 16/287,140 (now U.S. Pat. No. 10,652,721), filed Feb. 27, 2019, and entitled "PROVIDING MULTIMEDIA WIRELESS EMERGENCY ALERTS," the entirety of which application is hereby incorporated by reference herein.

TECHNICAL FIELD

The present application relates generally to the field of wireless communication and, more specifically, to the reception of cellular broadcast wireless emergency alert messages and the reception of multimedia content related to the alert messages.

BACKGROUND

Wireless Emergency Alerts (WEAs) have been deployed in the U.S. since 2012. The initial rules for WEA included an English language alert message that does not exceed 90 characters of alphanumeric text, with three classes of alert messages defined: Presidential Alert, Imminent Threat Alert; and Child Abduction Emergency/AMBER Alert. The alert message comprised five mandatory elements—event type, area affected, recommended action, expiration time (with time zone), and sending authority. Further, the alert message could not include a universal resource locator (URL), which can be used to download content from a network source associated with the URL, or telephone number, so as to minimize potential congestion impacts to the communication network. Since the adoptions of these initial rules, there have been on-going discussions relating to enhancements of the WEA system.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
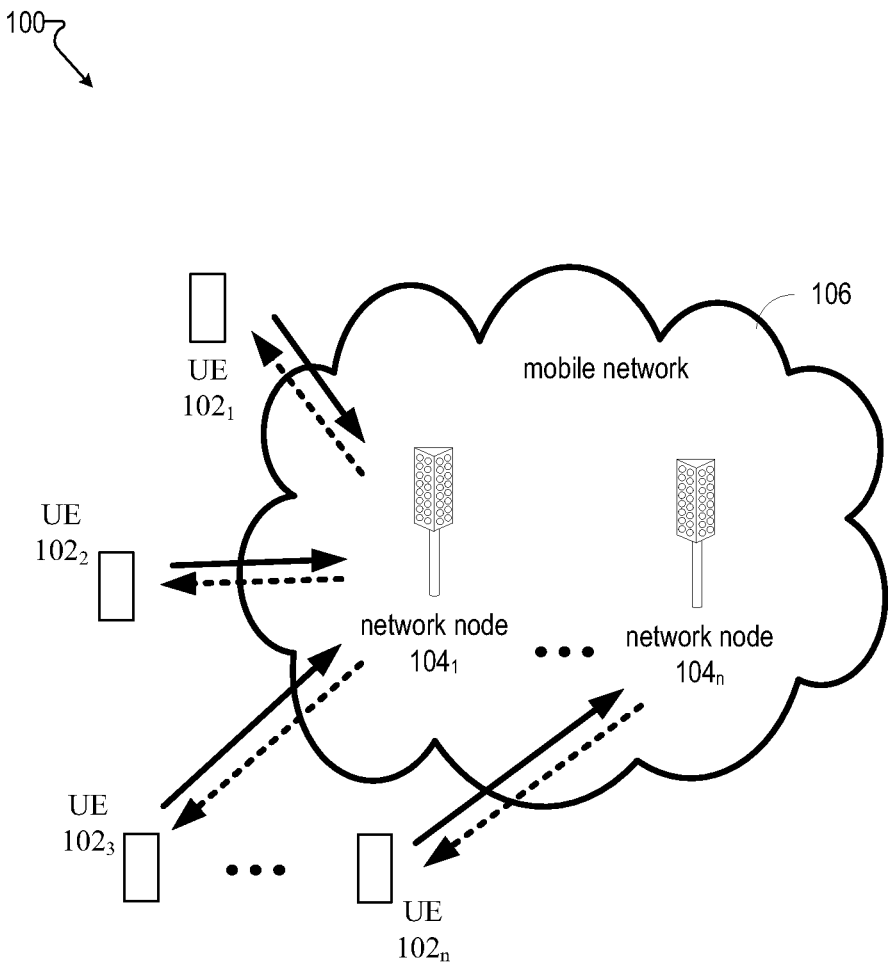
FIG. 1 illustrates an example wireless communication system having a network node (which can also be referred to as a network node device) and user equipment (UE) in accordance with various aspects and embodiments (also referred to as non-limiting embodiments), of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by a device (e.g., one or more devices) comprising programmable processors that execute machine executable instructions (e.g., computer program product, computer-readable instructions, software, software programs, software applications, software modules, etc.) to facilitate performance of the operations described herein. Examples of such a device, or devices, can comprise circuitry and components as described in FIG. 9 and FIG. 10.

Since the deployment of WEAs in 2012, there have been proposed enhancements and rule changes related to the WEA system. In addition to promulgating geotargeting rules (e.g., delivery of WEAs to the specified target area with no more than a one-tenth of a mile overshoot), enhancements that are currently being addressed in the Alliance for Telecommunications Industry Solutions (ATIS) standards which go into effect May 2019 are, for example, an increase in the length of the message from 90 characters to 360 characters (for Long Term Evolution mobile networks), support for WEA messages in Spanish, allowing clickable embedded references such as URLs and telephone numbers, adding a new alert class for Public Safety alerts, and providing the ability for state and local agencies to initiate WEA tests. The latest Federal Communications Commission (FCC) rules also require alert messages to remain available in a consumer-accessible format on wireless devices for 24 hours after receipt, or until the consumer chooses to delete the message, which will enable the public to better review emergency information. This rule will go into effect on Nov. 30, 2019, with ATIS standards in development to be complete early 2019. Each of the above enhancements require changes throughout the WEA ecosystem, from the alert origination, to the Federal Emergency Management Agency (FEMA) Integrated Public Alert and Warning System (IP-AWS), to the Commercial Mobile Service Providers (CMSP) infrastructure, to user equipment (UE), such as mobile devices (e.g., mobile phones, cellular phones, cellular-enabled tablets etc.). The FCC continues to work with public safety officials and industry on additional enhancements such as rich media messages containing photos and videos, many-to-one messaging, and multilingual messaging other than Spanish.

One area of continued discussion is the desire to provide multimedia in WEA messages. WEA uses a standards-based broadcast technology that is text based. Wireless Emergency Alert (WEA) originators (emergency management entities, for example, the National Weather Service, FEMA, the White House, fire and police departments, etc., and other federal, state, and local authorities) have stressed the need to provide multimedia content in WEA messages. The FCC has suggested that there may be an opportunity to allow for multimedia WEA messages through use of evolved Multimedia Broadcast Multicast Service (eMBMS), a capability which is part of the standards supporting LTE—the mobile wireless network air interface that also supports Cell-Broadcast WEA. While eMBMS is part of the 3GPP standards for LTE, to date the functionality has not been widely deployed commercially. Even if it was available commercially, the functionality would not be ubiquitously deployed (not ubiquitous like cell broadcast); it would only be deployed in "hot spots" with dense capacity needs for video) and would require spectrum resources and new eMBMS capable UEs to receive the service (both for commercial services and for WEA). In addition, any support for WEA on eMBMS would require further standards development, and deployment challenges and practices would need to be addressed (such as how to manage dynamic spectrum allocation). Thus, eMBMS is not viewed as a viable solution for multimedia WEAs.

Emergency management entities (e.g., alert originators) are still seeking for multimedia content to be sent directly in the WEA message. This poses significant technical challenges as well, as multimedia content can comprise large file sizes, which can challenge the bandwidth allocated for the delivery of this multimedia content over the cell broadcast infrastructure. Additionally, the control channel-based SIB messaging being used for such notifications consumes the scarce radio capacity that is required for a variety of device types and categories, including traditional mobile broadband, CAT M (Category M, the second generation of LTE chipsets meant for Internet of Things (IoT) applications) and narrow-band IoT. Furthermore, the periodicity at which the alert messages are currently delivered is static, resulting in any message of a larger size to be delivered in a longer amount of time. For example, SIB1 in LTE uses a fixed schedule with a periodicity of 80 ms and repetitions made within 80 ms. As such, an alert message of any appreciable size might need to be transmitted piece-wise, with a portion of the alert message transmitted every 80 ms, and with each portion transmitted within a windowlength, until the entire alert message is delivered. In an emergency condition affecting a geographic area, such as a disaster, severe weather, on-road hazards, road-side hazards, or other threats to safety, the delay in delivery of emergency-related CB messages caused by a static periodicity can be significant and potentially detrimental.

Current WEA rules have been modified to allow for embedded URLs in WEA messages that point to a web site containing multimedia content. The embedded URLs in the WEA message would be "clickable" on the UE by a user of the UE, with the selection by the user identity resulting in the UE requesting and obtaining multimedia content from a network source related to the URL. However, this can also present challenges from an effectiveness standpoint (e.g., requires the user of the mobile device to take an affirmative action), and a bandwidth management standpoint (e.g., providing multimedia content to potentially millions of users in an impacted area).

The present application relates to the delivery of alert messages, and multimedia content related to the alert messages, to UEs. In some example embodiments, after receipt of a WEA message with an embedded reference that points to the location (e.g., location on the internet) of multimedia content, a UE can automatically (e.g., without user input subsequent to receiving the alert messages, such as "clicking" on a hyperlink or URL within the WEA message) request content from the location. In other example embodiments, the multimedia content can be requested and downloaded based on certain conditions (e.g., upon unlocking of UE's lock screen, with user authorization, or when a Wi-Fi network connection is established). In some example embodiments, the UE can then download the multimedia content, and present the multimedia automatically via a graphical user interface (e.g., GUI). In some example embodiments, the UE can download the multimedia content, and in accordance with certain conditions (e.g., user unlock of a phone), display the multimedia content. As such, an embedded reference in the WEA message can facilitate the request for, and delivery of, multimedia content comprising emergency and safety-related information, and can enhance a recipient's understanding of the emergency that is the subject of the WEA message.

FIG. 1 illustrates an example wireless communication system 100 (also referred to as wireless system, mobile system, mobile communications system) in which embodiments of the present disclosure can be implemented. In example embodiments (also referred to as non-limiting embodiments), wireless communication system 100 can comprise a mobile network 106 (mobile can also be referred to as cellular), which can comprise one or more mobile networks typically operated by communication service providers. The wireless communication system 100 can also comprise one or more user equipment (UE) $102_{1-n}$ (also referred to by example and in the singular as UE 102). UE $102_{1-n}$ can communicate with one another via one or more network nodes $104_{1-n}$ (referred to as network node 104 by example and in the singular) of the mobile network 106. The dashed arrow lines from the network nodes $104_{1-n}$ to the UE $102_{1-n}$ represent downlink (DL) communications and the solid arrow lines from the UE $102_{1-n}$ to the network nodes $104_{1-n}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, a C-V2X client device associated with (e.g., integrated with, inside of, embedded in, mounted upon, etc.) a vehicle (e.g., motor vehicle, such as a car, van, bus, truck, etc.), and the like. UE 102 can also comprise IOT devices that communicate wirelessly. In example embodiments, a UE can display a wireless emergency alert, and then can also present multimedia content for consumption (e.g., viewing, listening) by the user of the UE.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communication system 100 can be or can include a large scale wireless communication network that spans various geographic areas, and can comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communication system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 (e.g., network node 104 device) of the mobile network 106. Network node 104 can have a cabinet and other protected enclosure, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an evolved NodeB device (eNodeB device, as referred to in LTE terminology), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is typically referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

The upcoming 5G access network can also employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of another one, although supported by its infrastructure. The user plane (sometimes known as the data plane, forwarding plane, carrier plane, or bearer plane) carries the user data traffic, and the control plane carries signaling traffic. In example embodiments, the planes can be implemented in the firmware of routers and switches.

Figure 2:
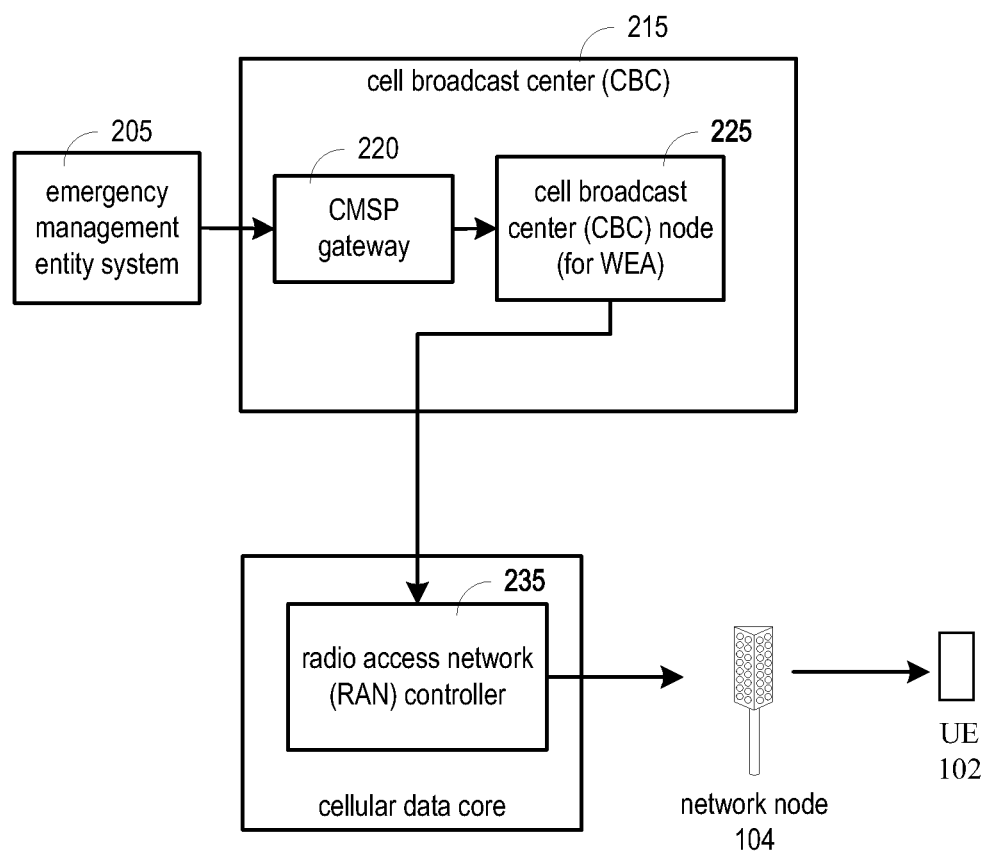
FIG. 2 illustrates an example wireless communication system comprising various network devices for delivering a cellular broadcast (CB) alert message, in accordance with various aspects and embodiments of the subject disclosure.

FIG. 2 shows network elements that can comprise example embodiments of some components for delivering cellular broadcast (CB) messages in accordance with various aspects and embodiments of the present application. As mentioned, a WEA message can be a CB message. In addition to the network node 104 and UE 102, the mobile network 106 can comprise an emergency management entity system 205. The mobile network 106 can further comprise a cell broadcast center (CBC) 215. The CBC 215 can comprise, for example, a cellular mobile service provider (CMSP) gateway 220 (e.g., a CMSP gateway device) and a CBC node 225 (e.g., a CBC node 225 device) for handling emergency alert messages (also referred to herein as emergency alert notifications). Additionally, the mobile network 106 can comprise a radio access network (RAN) controller 235 (e.g., RAN controller 235 device).

Still referring to FIG. 2, the emergency management entity system 205 can comprise one or more computing devices (e.g., a computer, a server, the like), for example a network communications transmitter, a Federal Alert Gateway device, and the like, that can forward or originate an emergency alert message, which can be transmitted as a CB message (e.g., WEA 305) by a network node (e.g., network node 104). The emergency management entity system 205 can be operated or affiliated with an emergency management entity, for example, the Federal Emergency Management Agency (FEMA) and any other federal, state, or local agencies and administrative bodies that issue emergency alert messages (e.g., alerts related to presidential alerts, imminent threats, severe weather alerts, disaster alerts, America's Missing: Broadcast Emergency Response (AMBER) alerts, and other safety-related messages).

The emergency management entity system 205 can transmit the emergency alert message to the CMSP gateway 220, which can accept emergency alert messages from the emergency management entity system 205 (e.g., in compliance with, for example, the ATIS/TIA (Telecommunications Industry Association) wireless emergency alert (WEA) Federal Alert Gateway to CMSP Gateway Interface Specification). The CMSP gateway 220 can route, or forward, the emergency alert message to the CBC node 225, which can handle emergency alert messages that are sent as wireless emergency alerts (WEA).

Still on FIG. 2, the CBC node 225 can handle and manage the sending of messages received from the emergency management entity system 205 via the CMSP gateway 220. The CBC node 225 can route an emergency alert message to the appropriate RAN controllers (e.g., RAN controller 235), and the CBC node 225 can implement the interfaces connecting it to the RAN controllers.

The RAN controller 235 (e.g., base station controller (BSC), radio network controller (RNC), mobility management entity (MME), and access and mobility management function (AMF) are the names of RAN controllers for 2G, 3G, 4G, and 5G networks, respectively) in the operator's radio network manages transmissions to a group of cells. The RAN controller 235 can, after receiving the emergency alert message, distribute the emergency alert message to the target cells by transmitting or routing the emergency alert message to the network node 104. The network node 104 can deliver the emergency alert message to UEs as a CB message.

The network node 104, described above with respect to FIG. 1, can send the emergency alert message wirelessly to the UE 102 as a CB message.

Other data elements of the alert message can specify, for example, the geographic area effected by the emergency, so that delivery of the CB message only goes to UEs served by network nodes in the geographic area.

Figure 3:
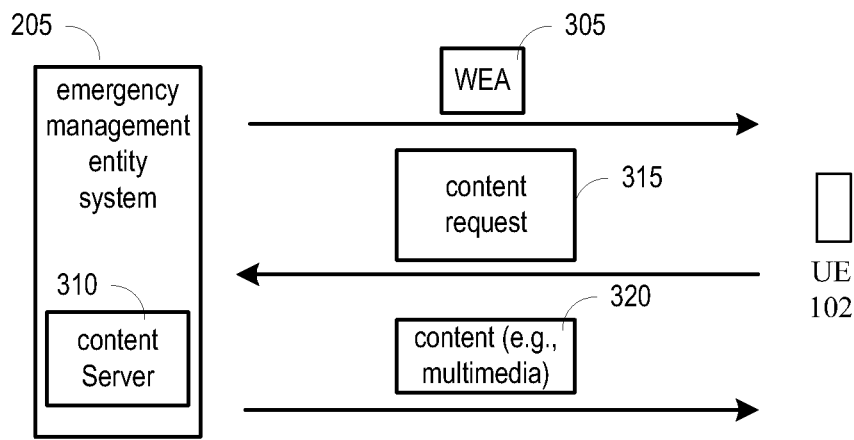
FIG. 3 illustrates an example process for receiving a wireless emergency alert, sending a content request using a reference (e.g., network address information, URL, etc.) associated with the wireless communication system, and receiving multimedia content for display, in accordance with various aspects and embodiments of the subject disclosure.

Moving on to FIG. 3, a UE (e.g., UE 102) can comprising a processor and a memory that stores executable instructions that, when executed by the processor, facilitate performance of operations as described herein. In example embodiments, the UE can, after receiving a WEA message, recognize an embedded reference (e.g., URL) in the WEA message (or associated with the WEA message), and automatically (e.g., without user input or intervention) direct the UE to a content server whose network location is associated with the embedded reference. After the UE receives the multimedia content from the content server, the UE can prepare and provide the content for consumption (e.g., viewing, listening, or both) by the user of the UE. The example embodiments can allow for multimedia WEA content to be accessible without the need for overly complex solutions for broadcasting multimedia content in WEA messages. In addition, example embodiments of the present application provide flexibility for alert originators (e.g., emergency management entities) to create content on Web pages and social media pages, from which WEA message recipients can obtain content for more detailed information of related to the WEA message.

Operationally, in example embodiments, the UE 102 can receive a CB message (e.g., a text message) comprising a data element identifying the cellular broadcast message as a wireless emergency alert (e.g., WEA 305). The WEA message can be sent, for example, using the architecture as described in FIG. 2.

The CB message can also comprise network address information (e.g., URL) that identifies a network location associated with content (e.g., multimedia content, such as a picture, audio, video, or a combination of one or more of text, pictures, audio, and video) to be transmitted to the UE 102, wherein the content can be stored at a repository associated with, and accessible by, a server device (e.g., a content server 310). The server device can be in an emergency management entity system (e.g., emergency management entity system 205). The network address information can comprise, for example, a universal resource locator (URL), also colloquially referred to as a "web address," and can be used to identify the network location of the server device and is usable to route a request for content to the server device. In example embodiments, an embedded URL can be sent in the WEA text itself. Although URLs most commonly to refer to web pages, they are also used for file transfer, email, database access, and many other applications.

After the CB message is received by the UE, the UE can, in response to detecting that the cellular broadcast message comprises the data element identifying it as a WEA message, analyze the WEA message to determine the network address information (e.g., URL) where the server device is located. In example embodiments, the UE can execute a routine that comprises parsing the message to search for the embedded reference (e.g., URL).

In example embodiments, the UE can then, using the determined URL, automatically set up a data session to connect to the server device associated with the embedded reference (e.g., URL), initiating a session. To request the multimedia content, the UE can send a content request (e.g., content request 315) to the server device. The content request can, in example embodiments, take the form of a hypertext transfer protocol (HTTP) "get" message. The content request can also be a request for broadcast (multicast) content, such as, for example, a multicast "join" request. The content request can be sent through, for example, the mobile network (e.g., mobile network 106). If the UE is connected to the internet via a Wi-Fi connection, the content request can also be sent via the Wi-Fi network. For example, the content request can be sent through a Wi-Fi access point, which can be a "mobile hotspot" device connected to a cellular network, or a Wi-Fi router connected to a fixed network, such as an Asymmetric Digital Subscriber Line (ADSL) or Data Over Cable Service Interface Specification Data Over Cable Service Interface Specification (DOCSIS) network). Optionally, although no user input is required to initiate the content request once the WEA message is received, the UE can allow for content request options regarding the automatic response. For example, the UE can be configured (e.g., by the user, by the vendor supplying the UE, by software provided by the mobile network provider) to request content when the UE is connected to either a cellular network or Wi-Fi network, to request content only when the UE is connected to Wi-Fi, to request content upon an unlock of the UE (e.g., from a "locked screen" to a, e.g., "home screen"), or to request content only with user authorization (e.g., pre-approved to request multimedia content related to WEAs, prompted to request multimedia content upon receipt of a WEA, or prompted to request multimedia after receipt of a WEA and after unlocking of the UE).

The server device (e.g., content server 310), after receiving the request from the UE, can then send (e.g., "serve up") the content (e.g., content 320) related to the WEA. It can send the content to the UE via, for example, the mobile network (e.g., mobile network 106). In example embodiments, the content can be sent via a cellular data connection. In example embodiments, the content can be sent via a user data channel (e.g., bearer) that carries user data traffic. It can also send the content to the UE, for example, via a Wi-Fi network (e.g., if the UE is connected to a Wi-Fi access point) connection. In example embodiments, similar options to content requests can apply for obtaining content through various networks. For example, the UE can be configured to download content when the UE is connected to either a cellular network or Wi-Fi network, to download content only when the UE is connected to Wi-Fi, or to download content when the user authorizes. The UE can be configured (e.g., by the user, by the vendor supplying the UE, by software provided by the mobile network provider) to download content when the UE is connected to either a cellular network or Wi-Fi network, to download content only on when the UE is connected to Wi-Fi, to download content upon an unlock of the UE (e.g., from a locked screen to, e.g., a home screen), or to download content only with user authorization (e.g., pre-approved to download multimedia content related to WEAs, prompted to download multimedia content upon receipt of a WEA, or prompted to download multimedia after receipt of a WEA and after unlocking of the UE).

Once the UE has received the content from the server device, the UE can provide the content via a graphical user interface (GUI) displayed on a screen of the user equipment. The GUI can be, for example, the same window that displays the WEA message. The GUI can be some other type of computer-generated window. The GUI can also be, for example, a web browser instantiated by the UE. Thus, the GUI would allow a user identity associated with the UE to view the multimedia content related to the WEA message. Examples of these displays are shown with respect to FIGS. 4 and 5 below. In other aspects in accordance with example embodiments of the present application, the UE can allow the user some control over the conditions in which the content is to be presented by the UE. Configuration options can be presented to the user to automatically display, display only on user acknowledgement, or never display content. In other aspects, the UE can facilitate the rendering (e.g., generation) of the content the content for presentation (show, display, play, etc.) while the phone is in an idle mode. It can, for example, overlay the GUI that presents the content over a displayed screen saver or "lock screen." In yet other aspects, the UE can cache the content in its memory, and provide the content via the GUI upon a change of the user equipment from the idle state to an active state (e.g., once a user has unlocked the UE (e.g., after entry of a passcode or security pattern to unlock the phone from a locked or idle state)). As such, there are numerous manners in which the downloaded multimedia content can be provided (e.g., played, displayed, etc.).

In other example embodiments, instead of (or in addition to) having the embedded reference (e.g., URL) in the WEA text, the reference can be included as an included as a data element in the System Information Block (SIB) 12, which carries the WEA messages on a control channel for carrying control messages (e.g., an LTE control channel). When a mobile device receives a WEA broadcast on SIB12, it will detect the embedded reference element in the radio resource control RRC message, and auto-connect (e.g., without user intervention) to the server device associated with that URL. Using either the WEA messages with the embedded URLs in the text, or as part of a data element in a system information block of a control channel, updates to the multimedia content can be easily accommodated through WEA "update" messages.

In other aspects related to example embodiments of the present application, the mobile network can exclude from a user identity's bill or allotted download capacity the WEA message, and the content. As such, a user would not be billed for the WEA message or the transmission of content. As an example, a user that's subscriber agreement includes a plan that allots the user to download two gigabytes (2GBs) of data per month would not have the downloaded emergency content count towards the 2 GB s allotted.

If the cellular broadcast message received by the UE does not comprise the data element identifying it as a WEA message, the UE can just treat it like a regular non-emergency text message (e.g., will not be automatically requesting the content).

To assist with the facilitation of network congestion, in example embodiments, the UE can delay transmitting its request for content, such that all UEs that received the WEA message having a URL associated with it would not be collectively sending content requests at the same time, or approximately the same time. Such behavior can create network congestion, crash the server device, or otherwise render the server device unable to respond to all the requests for content.

In example embodiments, the user equipment can use a "back-off" routine, whereby it transmits the content request after a delay time T selected by the user equipment based on, for example, a random number generator the delay time T from within a time range. The delay time can be, for example, a half a minute, or thirty seconds, one minute, two minutes, etc. With a multitude of user equipment selecting different delay times, the result would be that not all the requests would be sent through the network at the same time, potentially alleviating congestion in the network (e.g., mobile network 106). In example embodiments, a network device (e.g., the RAN controller 235) can determine the number of devices that are to receive the WEA message. If the number of devices is high (or the number of devices in a site or sector are high, e.g., very dense), the network device can place a data element associated with the WEA, for example, instructing the UE to perform the back-off routine. In example embodiments, in response to a determination that a very large number of UEs is to receive the WEA, the network device can use a data element (e.g., a couple of bits transmitted in the SIB) to instruct the UE to select more delay times in a range, and/or select delay times from a broader time range (e.g., select from a range of delay times up to three minutes, as opposed to up to one minute). Conversely, in example embodiments, the UE can receive a signal from a network device (e.g., data elements in the SIB) instructing it not to employ the use of the back-off algorithm at all, in response to a determination by the network device that very few UEs will be impacted by the emergency (for example, less than twenty UEs). Or, the default settings of the UE can be to not employ the use of the back-off routine algorithm, unless positively instructed by the network (e.g., a network device), for example, using a data element in the SIB.

In example embodiments, in response to a determination (e.g., by the RAN controller 235) that a cell site or sector is congested, an instruction can be sent along with the WEA (e.g., via a couple of bits transmitted in the SIB) to pull lower quality multi-media. Also, for example, WEAs sent to UEs in uncongested cells can comprise a URL to higher quality (e.g., high definition) multimedia content, while WEAs sent to UEs in congested areas can comprise, for example, a URL to lower quality (e.g., standard definition) multimedia content. In example embodiments, a threshold number of UEs per area can be used to determine whether a site or sector is congested.

Other conditions can also be used to determine whether the transmission of a request for content will occur immediately, or after a delay. The UE can, for example, transmit the request after a change in the user equipment from an inactive state to an active state. If a user's phone is idle (e.g., locked, inactive, asleep), the device might receive the WEA and provide an audible alert indicating the receipt of a WEA, but the UE can delay transmitting a request for content until the user device is in an active mode (e.g., not asleep, not idle, unlocked). This way, devices that are not being viewed at the time, while still receiving a wireless emergency alert, can delay sending its content request. In another circumstance, the UE might not employ the back-off routine in response to being connected to a Wi-Fi network. Or, the UE might employ the back-off routine in response to not being connected to a Wi-Fi access point. Still yet, the UE might employ the use of the back-off routine if it is only connected to the mobile network.

Figure 4:
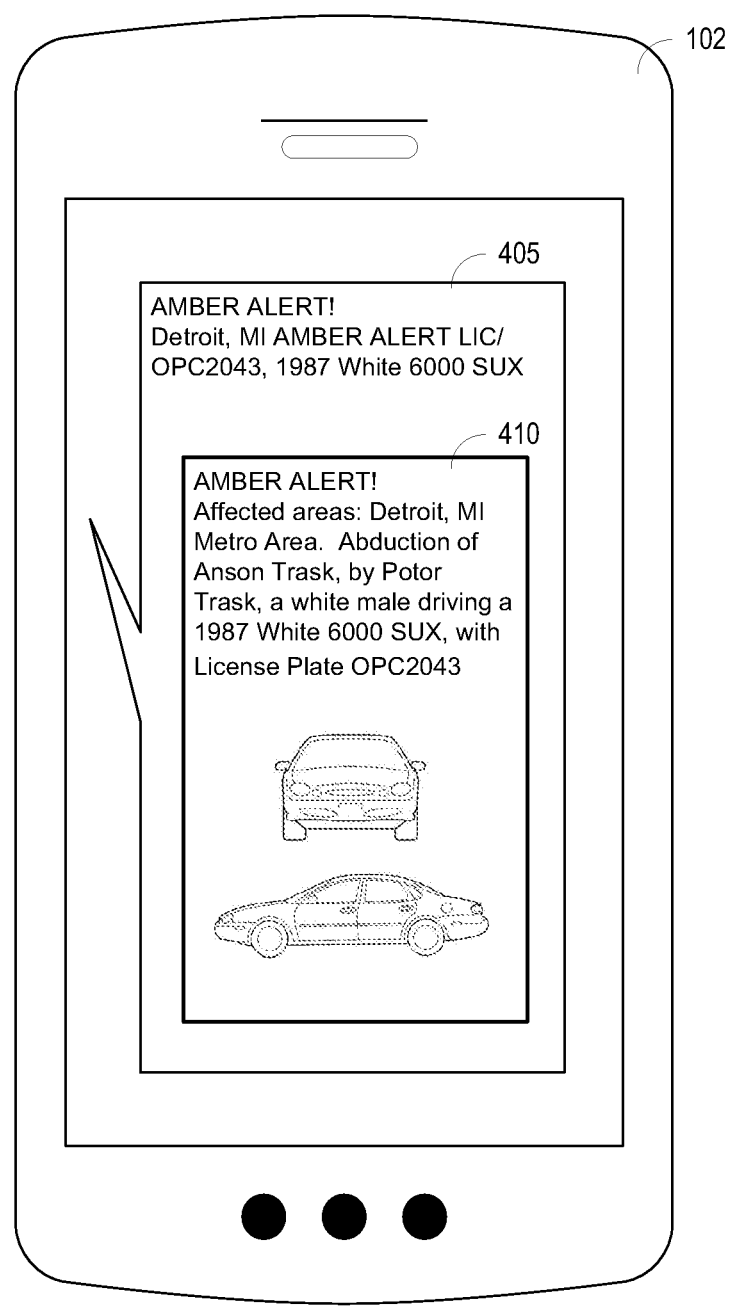
FIG. 4 illustrates an example graphical user interface for providing multimedia content embedded in a WEA message, in accordance with various aspects and embodiments of the subject disclosure.

FIG. 4 shows an example of a GUI that comprises a text message 405 that displays information related to a received wireless emergency alert (e.g., WEA 305). In the example shown, the text of the WEA message is very brief, indicating that it is an Amber Alert, the location being Detroit, Mich., and the License plate of the vehicle and the model of the vehicle. FIG. 4 also shows a GUI that overlays (or, is embedded in) the text message displaying multimedia content (e.g., content 320) received from a server device (e.g., content server 310, operated by an emergency management entity). Here, the example displayed multimedia content, provides a mix of texts and images, for example, the name of the abductee, name and description of the abductor, and an image of the vehicle involved. The amount of relevant and potentially helpful information provided via the multimedia content automatically obtained by the UE provides more information and context related to the emergency. Particularly in the case of motor vehicles in an Amber Alert, a user of the UE would not have to perform an internet search to visualize the make, model, and color of the vehicle involved in the emergency. The provided multimedia can also include, for example, video clips, or audio related to the Amber Alert emergency. As another example, in the even of a hurricane or tornado, video showing the storm, the winds, and damage that the storm is causing can convey the serious nature of the emergency in the vicinity of the user of the UE, and can also provide safety tips on what to do, or evacuation instructions, both in visual and audio format.

Figure 5:
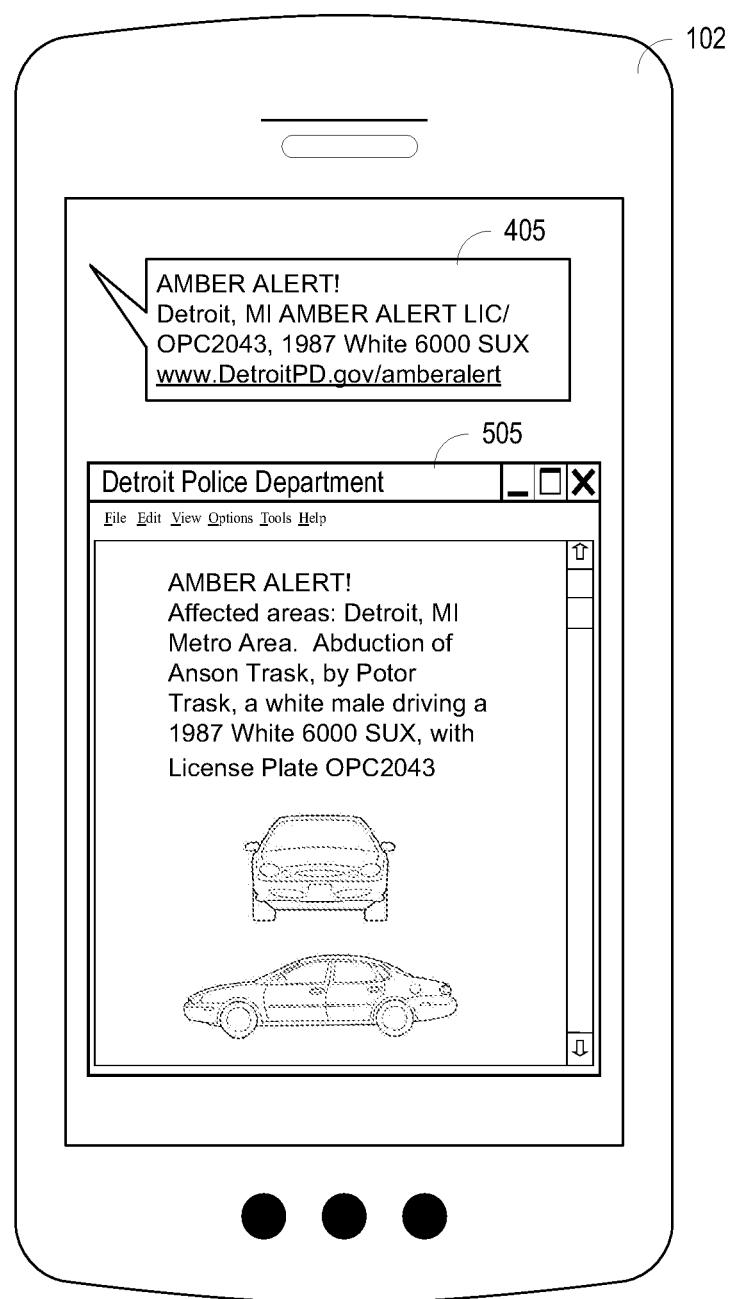
FIG. 5 illustrates another example graphical user interface (e.g., web browser) for providing multimedia content, in accordance with various aspects and embodiments of the subject disclosure.

Referring now to FIG. 5, a UE can display a WEA message in a text message 405, but in FIG. 5, a web browser 505 has also been instantiated by the UE that provides the multimedia content (e.g., content 320), received, in this example, from a server device operated by the Detroit Police Department, which in this example is the emergency management entity associated with the WEA message and the provided multimedia content. In this example, a reference has been embedded in the text message. In example embodiments, the UE can parse or search through the text message to obtain the URL, and use that URL to send a content request to a content server (e.g., server device operated by the Detroit Police Department, in this example), which can, in response to the request, provide the multimedia content related to the WEA message to the UE. After receipt of the content, the UE can display the content received by the UE in an instantiated web browser 505.

In example embodiments, a device (e.g., a UE, for example UE 102), comprising a processor and a memory that stores executable instructions that, when executed by the processor, facilitate performance of operations, including those operations/methods as described above, and also below in FIGS. 6, 7, and 8. In each of these operations, steps or aspects described in one operation can be substituted or combined with steps and aspects with respect to the other operations, as well as features described, unless context warrants that such combinations or substitutions are not feasible. Further, if a feature, step, or aspect is not described with respect to example operations, this does not mean that said feature, step, or aspect is incompatible or infeasible with respect to those operations. As such the example operations of the present application described above and below are not necessarily limited to the steps, features, or aspects that are described with respect to those example operations.

Figure 6:
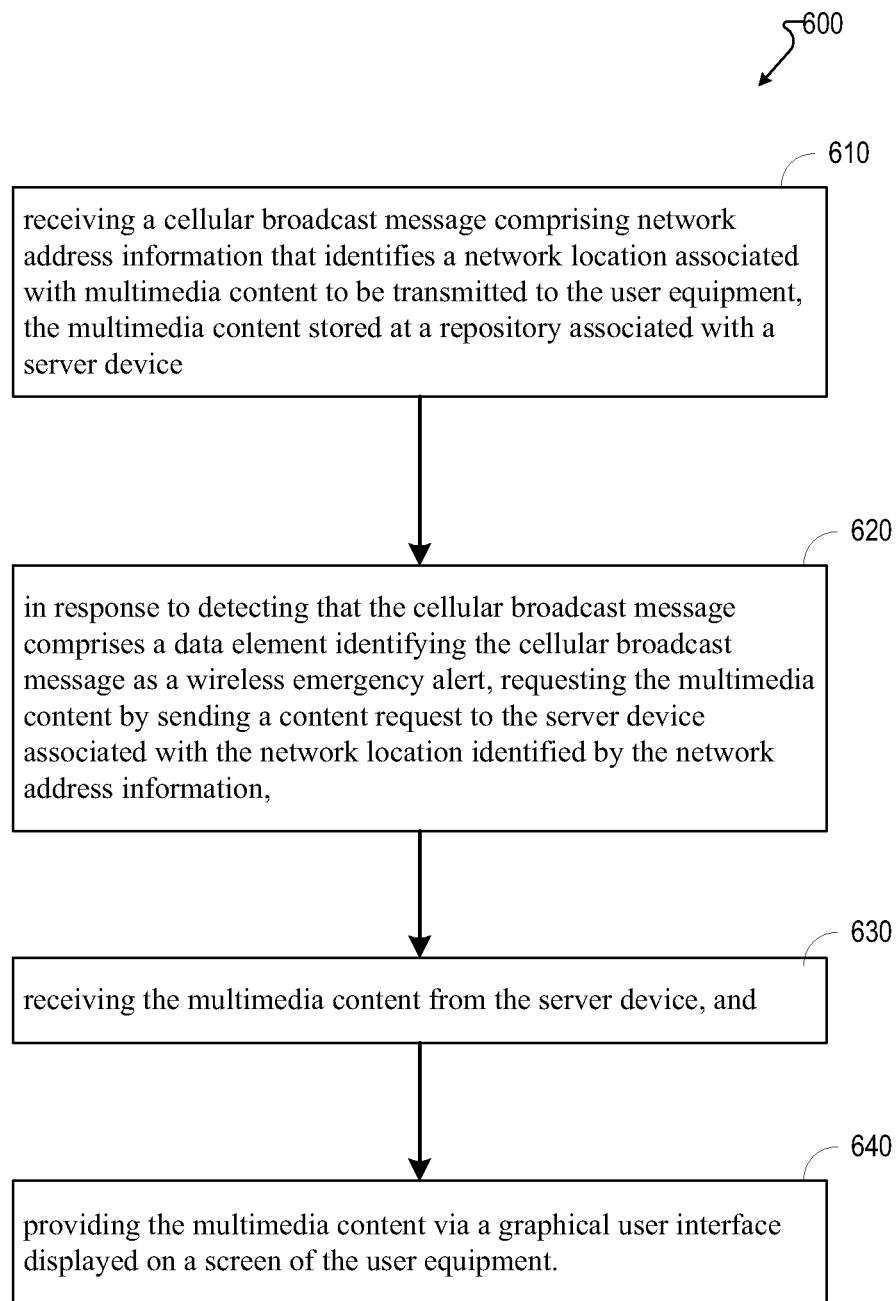
FIG. 6 illustrates example operations that can be performed by a UE for receiving a CB alert message, transmitting a content request, and receiving multimedia content, in accordance with various aspects and embodiments of the subject disclosure.

FIG. 6 illustrates a flow diagram of example operations 600 that can be performed, for example, by a user equipment (e.g., UE 102) comprising a processor and a memory that stores executable instructions that, when executed by the processor, facilitate performance of the operations described in FIG. 6.

At block 610, the example operations 600 can comprise receiving a cellular broadcast message (e.g., WEA 305 comprising a text message) comprising network address information (e.g., a universal resource locator URL) that identifies a network location associated with multimedia content (wherein the multimedia content relates to an emergency condition associated with the wireless emergency alert) to be transmitted to the user equipment, the multimedia content stored at a repository associated with a server device (e.g., content server 310, operated by an emergency management entity).

At block 620, the example operations 600 can further comprise, in response to detecting that the cellular broadcast message comprises a data element identifying the cellular broadcast message as a wireless emergency alert, requesting the multimedia content (e.g., images, videos, audio, or some combination thereof) by sending a content request (e.g., content request 315) to the server device associated with the network location identified by the network address information.

At block 630, the example operations 600 can further comprise receiving the multimedia content (e.g., content 320) from the server device, The example operations 600, at block 640, can further comprise providing the multimedia content via a graphical user interface (e.g., text message 405, web browser 505) displayed on a screen of the user equipment.

Still referring to FIG. 6, in example embodiments, prior to the UE receiving the cellular broadcast message, the cellular broadcast message can be routed via a radio access network controller device (RAN controller 235) of a wireless network (e.g., mobile network 106). The radio access network controller can comprise, for example, a mobility management entity device (e.g., MME in an LTE network). The radio access network controller can comprise, for example, an access and mobility management entity device (AMF in a 5G network). The cellular broadcast message can also be routed via a cellular broadcast center node device and further routed via a network node device (e.g., network node 104) of the wireless network.

Figure 7:
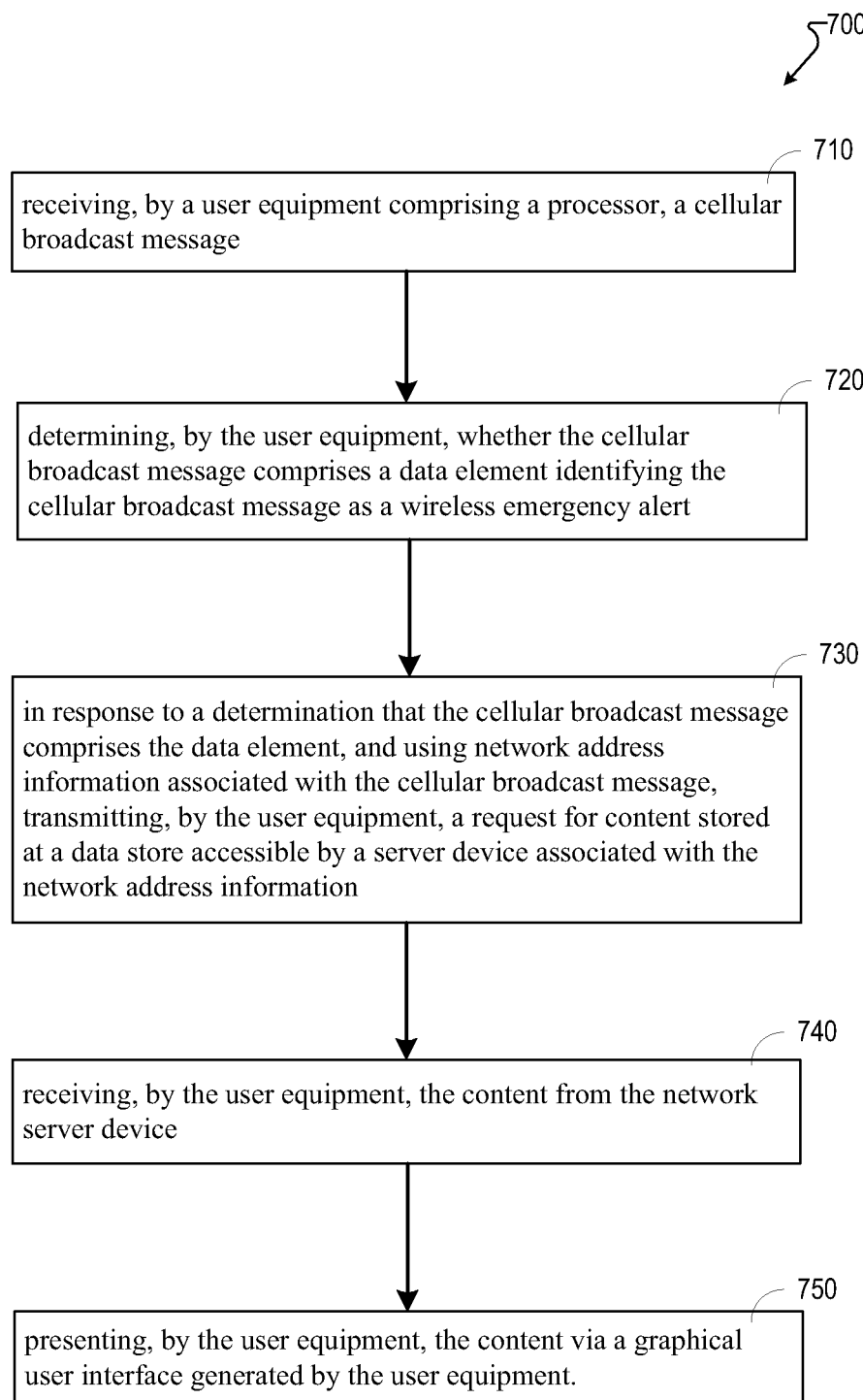
FIG. 7 illustrates another example of operations that can be performed by a UE for receiving a CB alert message, transmitting a content request, and receiving multimedia content, in accordance with various aspects and embodiments of the subject disclosure.

FIG. 7 illustrates a flow diagram of another example of operations that can be performed, for example, by a user equipment (e.g., UE 102) comprising a processor and a memory that stores executable instructions that, when executed by the processor, facilitate performance of the operations described in FIG. 7.

At block 710, the example operations can comprise receiving, by a user equipment comprising a processor, a cellular broadcast (CB) message (e.g., WEA 305).

At block 720, the example operations can further comprise determining, by the user equipment, whether the cellular broadcast message comprises a data element identifying the cellular broadcast message as a wireless emergency alert.

Moving to block 730, the example operations can further comprise, in response to a determination that the cellular broadcast message comprises the data element, and using network address information (URL) associated with the cellular broadcast message (e.g., embedded in the text of the WEA message, or as an element in the SIB 12), transmitting, by the user equipment, a request (content request 315) for content (e.g., content 320) stored at a data store accessible by a server device (e.g., content server 310) associated with the network address information.

At block 740, the example operations can further comprise receiving, by the user equipment, the content via a communication network (e.g., mobile network 106, Wi-Fi network that is attached to a fixed network, such as an ADSL network or a DOCSIS network, etc.).

At block 750, the example operations can further comprise presenting, by the user equipment, the content via a graphical user interface (e.g., text message 405, web browser 505) generated by the user equipment.

Still referring to FIG. 7, in example embodiments, the transmitting the request can comprise transmitting the request via a Wi-Fi network connection. In example embodiments, the transmitting the request can comprise transmitting the request via a cellular data connection. The transmitting the request can further comprise transmitting the request after a delay time selected by the user equipment. The delay time can be selected based on, for example, a back-off routine that employs the use of a random number generator. The transmitting the request can further comprise, in response to an instruction from a network device, transmitting the request after a delay time has elapsed, wherein the instruction is based on whether a threshold number of mobile devices are being sent the cellular broadcast message, and the delay time is selected by the user equipment based on a random number generator with the seed based on the equipment identifier (e.g., International Mobile Equipment Identity (IMEI)). The transmitting the request can further comprise transmitting the request after a change in the user equipment from an inactive state to an active state, wherein the change can be based on an unlocking of the user equipment (e.g., entry of a password or pattern).

Figure 8:
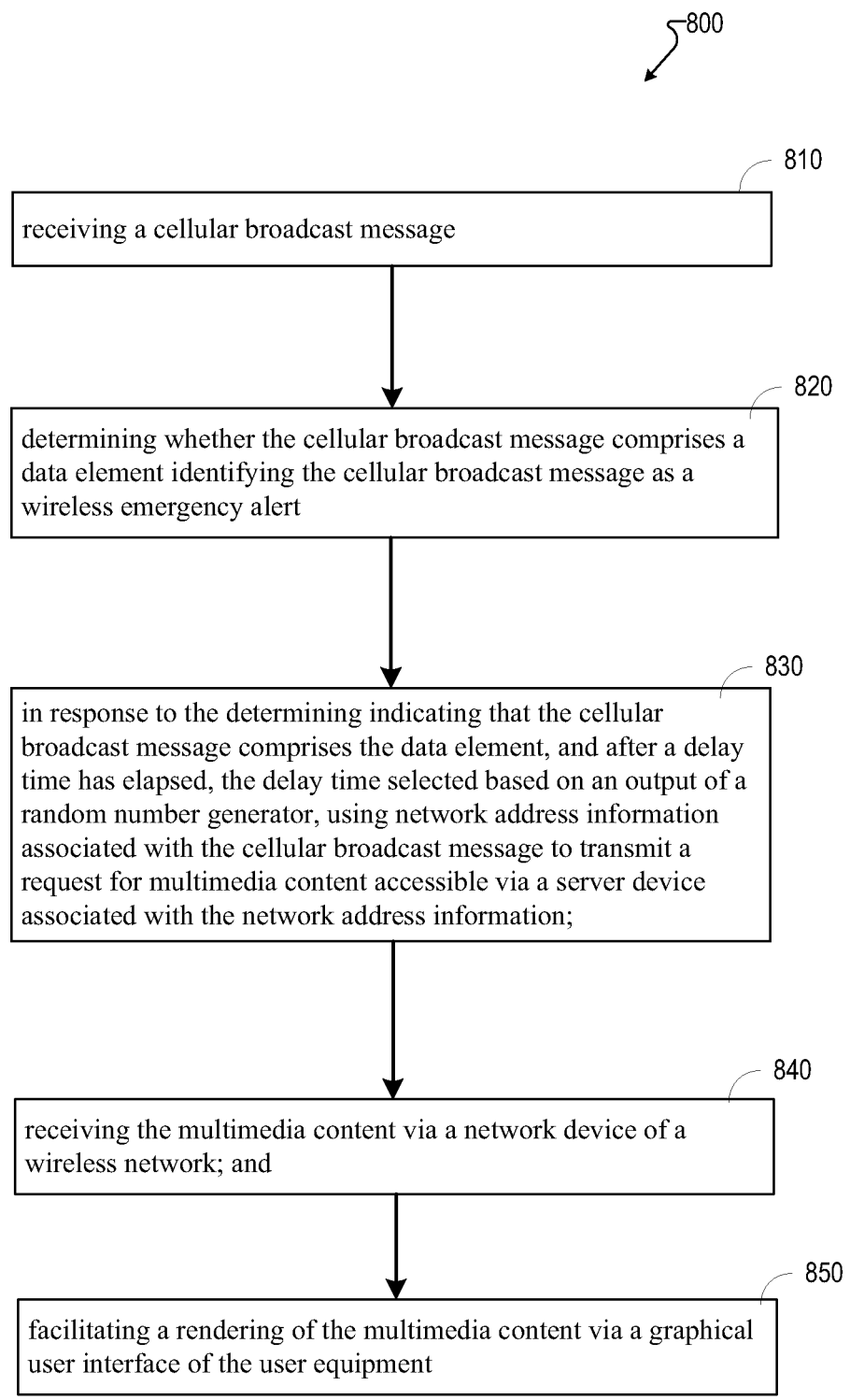
FIG. 8 illustrates another example of operations that can be performed by a UE for receiving a CB alert message, transmitting a content request, and receiving multimedia content, in accordance with various aspects and embodiments of the subject disclosure.

FIG. 8 illustrates a flow diagram of another example of operations that can be performed, for example, by a user equipment (e.g., UE 102) comprising a processor and a memory (e.g., a machine-readable storage medium) that stores executable instructions that, when executed by the processor, facilitate performance of the operations described in FIG. 8.

At block 810, the example operations can comprise receiving a cellular broadcast message (e.g., WEA 305).

At block 820, the example operations can further comprise determining whether the cellular broadcast message comprises a data element identifying the cellular broadcast message as a wireless emergency alert.

At block 830, the example operations can further comprise, in response to the determining indicating that the cellular broadcast message comprises the data element, and after a delay time has elapsed, the delay time selected based on an output of a random number generator, using network address information (e.g., a URL) associated with the cellular broadcast message to transmit a request (e.g., content request 315) for multimedia content (e.g., content 320)

accessible via a server device (e.g., content server 310) associated with the network address information.

At step 840, the example operations can further comprise, receiving the multimedia content from the server device. The multimedia content can be received from the server device via a user data channel that carries user data traffic, wherein a billing account (e.g., subscriber account) associated with the user equipment is not billed for the receiving the multimedia content.

At step 850, the example operations can further comprise facilitating a rendering of the multimedia content via a graphical user interface (e.g., text message 405, web browser 505) of the user equipment. Facilitating the rendering can comprise playing the multimedia content via a web browser upon entry of the user equipment from an idle state into an active state triggered by unlocking the user equipment. Facilitating the rendering can also comprise caching the multimedia content in a memory (e.g., random access memory (RAM)), and providing the multimedia content via the graphical user interface upon a change of the user equipment from an idle state to an active state (e.g., from asleep, or locked, to awake, or unlocked), wherein the change can be triggered by (e.g., in response to) unlocking the user equipment.

Figure 9:
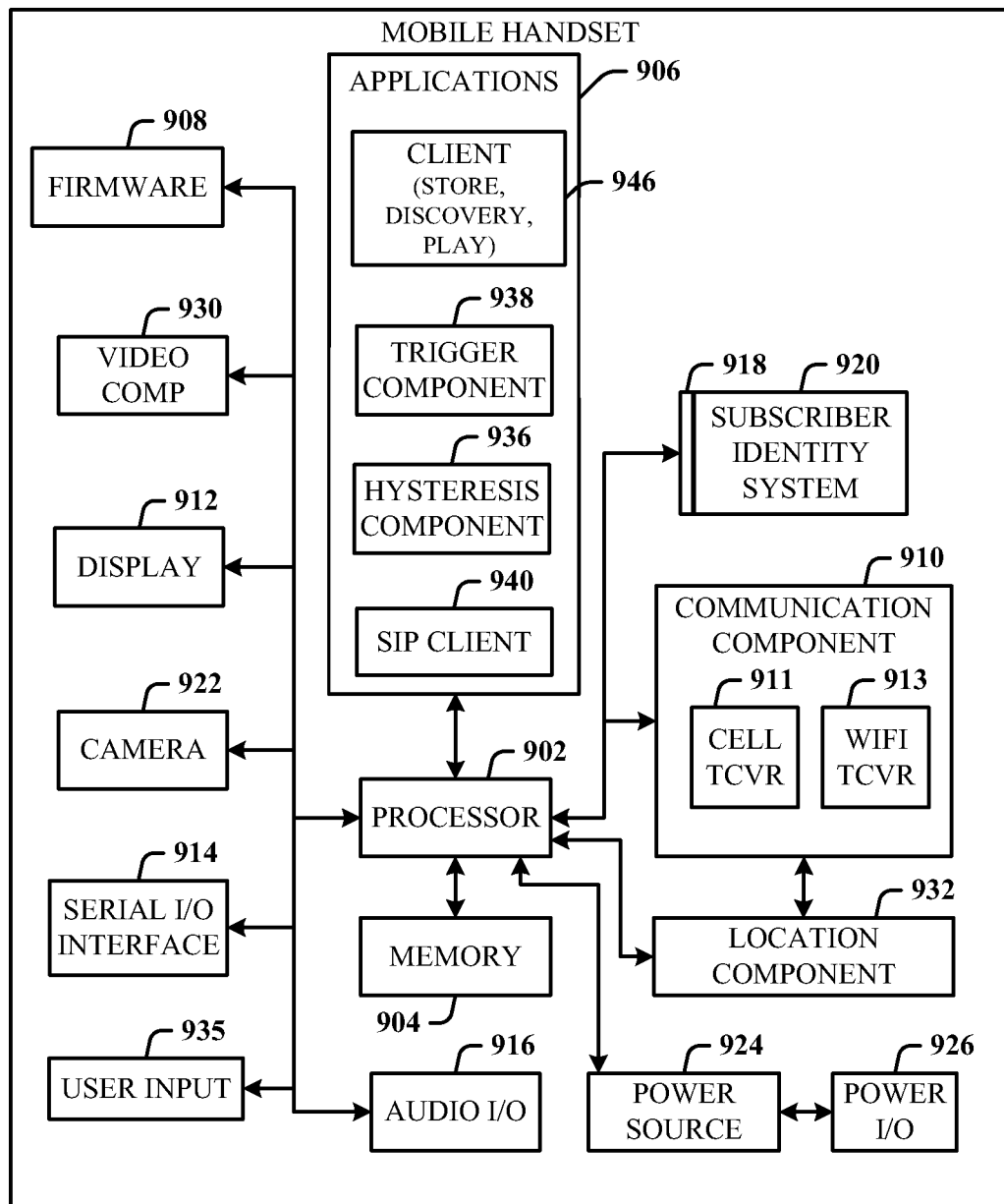
FIG. 9 illustrates a block diagram of an example user equipment that can execute processes and methods described herein, in accordance with various aspects and embodiments of the subject disclosure.

Referring now to FIG. 9, illustrated is a schematic block diagram of an example end-user device such as a user equipment (e.g., UE 102) that can be a mobile device 1600 capable of connecting to a network in accordance with some embodiments described herein. One or more of the components as illustrated in FIG. 9 can comprise the user equipment, and although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, comprises an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

Figure 10:
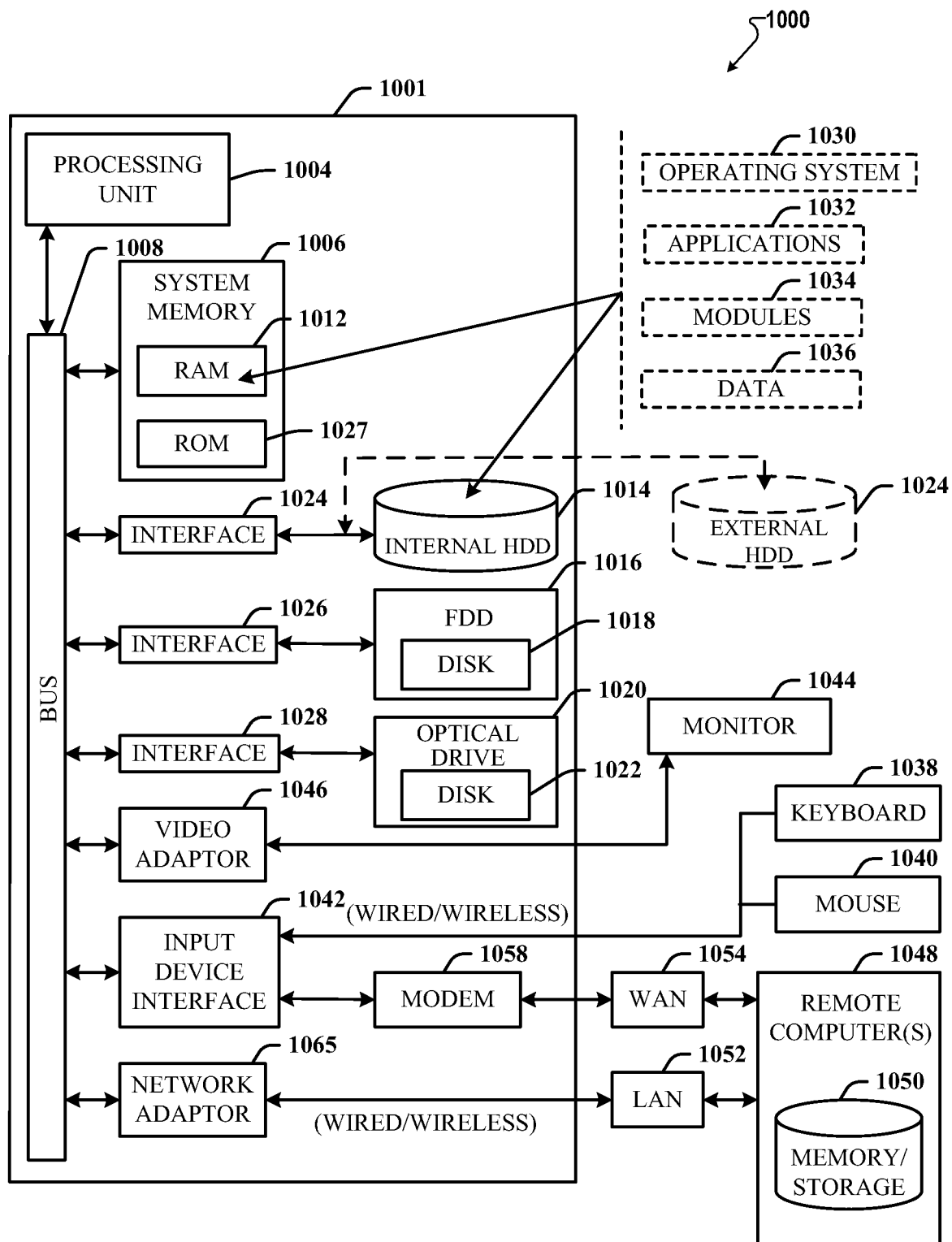
FIG. 10 illustrates an example block diagram of a computer that can execute processes and methods described here, in accordance with various aspects and embodiments of the subject disclosure.

Referring now to FIG. 10, there is illustrated a block diagram of a computer 1000 that can execute the functions and operations performed in the described example embodiments. For example, relay devices can contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects and example embodiments described herein, devices (e.g., emergency management entity system 205, CMSP gateway 220, CBC node 225, content server 310, RAN controller 235, network node 104, etc.) can include a computer 1000, the computer 1000 comprising a processing unit 1004, a system memory 1006 and a system bus 1008. The system bus 1008 couples system components comprising the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is to be appreciated that the embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer can communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11

(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several example embodiments, such feature can be combined with one or more other features of the other example embodiments as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A user device, comprising:
a processor; and
a memory that stores executable instructions that, when executed by the processor, facilitate performance of operations, comprising:
receiving a cellular broadcast message comprising network address information that identifies a network location associated with multimedia content to be transmitted to the user device, the multimedia content stored at a repository associated with a server device,
in response to detecting that the cellular broadcast message comprises a data element identifying the cellular broadcast message as a wireless emergency alert, requesting the multimedia content after a delay time selected by the user device, by sending a content request to the server device associated with the network location identified by the network address information,
receiving the multimedia content from the server device, and
rendering the multimedia content via a graphical user interface of a display of the user device.

2. The user device of claim 1, wherein the cellular broadcast message comprises a text message.

3. The user device of claim 1, wherein the network address information comprises a universal resource locator usable to route the content request to the server device.

4. The user device of claim 1, wherein the multimedia content relates to an emergency condition associated with the wireless emergency alert.

5. The user device of claim 1, wherein the operations further comprise:
in response to an instruction from a network device, selecting the delay time from a range of delay times.

6. The user device of claim 5, wherein the instruction, based on a determination concerning a number of user devices that are to receive the wireless emergency alert, instructs the user device to broaden the range of delay times for the selecting.

7. The user device of claim 1, wherein the operations further comprise:
in response to an instruction from a network device based on a determination concerning a number of user devices that are to receive the wireless emergency alert, sending the content request without selecting the delay time.

8. The user device of claim 1, wherein the server device comprises a content server device operated by an emergency management entity.

9. The user device of claim 1, wherein the cellular broadcast message was routed via a cellular broadcast center node device and further routed via a network node device of the wireless network.

10. A method, comprising:
receiving, by a user equipment comprising a processor, a cellular broadcast message while the user equipment is in an inactive state;
determining, by the user equipment, whether the cellular broadcast message comprises a data element identifying the cellular broadcast message as a wireless emergency alert;
in response to a determination that the cellular broadcast message comprises the data element, and using network address information associated with the cellular broadcast message, transmitting, by the user equipment, after a change in the user equipment from the inactive state to an active state, a request for content stored at a data store accessible by a server device associated with the network address information;
receiving, by the user equipment, the content via a communication network; and
presenting, by the user equipment, the content via a graphical user interface generated by the user equipment.

11. The method of claim 10, wherein the transmitting the request comprises transmitting the request via a Wi-Fi network connection.

12. The method of claim 10, further comprising making, by the user equipment, the change from the inactive state to the active state in response to a user input.

13. The method of claim 10, further comprising, making, by the user equipment, the change from the inactive state to the active state in response to entry of at least one of a password or a pattern.

14. The method of claim 10, further comprising, in response to the determination that the cellular broadcast message comprises the data element, providing, by the user equipment, an alert while remaining in the inactive state.

15. The method of claim 10, wherein the change is based on an unlocking of the user equipment.

16. A machine-readable storage medium, comprising executable instructions that, when executed by a processor of a user equipment, facilitate performance of operations, comprising:
receiving a cellular broadcast message;
determining whether the cellular broadcast message comprises a data element identifying the cellular broadcast message as a wireless emergency alert;
in response to the determining indicating that the cellular broadcast message comprises the data element, selecting a delay time from a range of delay times based on an instruction from a network device, and using network address information associated with the cellular broadcast message to transmit a request, after the selected delay time has elapsed, for multimedia content accessible via a server device associated with the network address information;
receiving the multimedia content from the server device; and
facilitating a rendering of the multimedia content via a graphical user interface of the user equipment.

17. The machine-readable storage medium of claim 16, wherein the operations further comprise transmitting the request in response to a change of the user equipment from an idle state to an active state.

18. The machine-readable storage medium of claim 16, wherein the facilitating the rendering of the multimedia content via the graphical user interface comprises playing the multimedia content via a web browser in response to entry of the user equipment from an idle state into an active state triggered by unlocking the user equipment.

19. The machine-readable storage medium of claim 16, wherein the range of delay times corresponds to a number of user equipment that are to receive the wireless emergency alert.

20. The machine-readable storage medium of claim 17, wherein the change is triggered by unlocking the user equipment.

* * * * *